United States Patent [19]
Ohmori et al.

[11] Patent Number: 5,814,179
[45] Date of Patent: Sep. 29, 1998

[54] PROCESS FOR PRODUCING A BLOOD DIALYZER

[75] Inventors: Satoru Ohmori; Hironori Matsuda; Takahiro Daido; Takeyuki Kawaguchi, all of Iwakuni, Japan

[73] Assignee: Teijin Limited, Osaka, Japan

[21] Appl. No.: 654,312

[22] Filed: May 28, 1996

Related U.S. Application Data

[63] Continuation-in-part of Ser. No. 260,566, Jun. 16, 1994, abandoned.

[30] Foreign Application Priority Data

Jun. 21, 1993 [JP] Japan .................................. 5-149249
Nov. 16, 1993 [JP] Japan .................................. 5-286754
Mar. 24, 1994 [JP] Japan .................................. 6-53568

[51] Int. Cl.⁶ ............................................. B32B 31/00
[52] U.S. Cl. .......................... 156/294; 8/137.5; 156/74; 156/167; 210/321.61; 210/321.71; 210/321.8
[58] Field of Search ................................... 156/294, 167, 156/74; 210/321.61, 321.71, 321.8; 8/137.5

[56] References Cited

U.S. PATENT DOCUMENTS 2,460,282  2/1949  Gardner ..................................... 8/137.5
3,228,877  1/1966  Mahon ..................................... 210/321.8
5,470,474  11/1995  Assorge et al. ...................... 210/312.8

Primary Examiner—John J. Gallagher
Attorney, Agent, or Firm—Burgess, Ryan & Wayne

[57] ABSTRACT

A blood dialyzer is produced by a process in which a plurality of artificial composite fibers having core portions consisting of a water-insoluble core liquid and surrounded by sheath portions consisting of a fiber-forming polymer are subjected to a removal of almost all of the core liquid; the resultant hollow fibers are bundled; the hollow fiber bundle is packed in a cylindrical case having open end; end portions of spaces left between the hollow fibers peripheries and between the hollow fibers and the inside surface of the cylindrical case are sealed with a bonding material, to fix the hollow fiber bundle to the cylindrical case at the end portions thereof; and the hollow fibers in the cylindrical case are cleaned with a cleaning liquid comprising at least one aliphatic monohydric alcohol having 3 to 8 carbon atoms.

11 Claims, 2 Drawing Sheets

PROCESS FOR PRODUCING A BLOOD DIALYZER

RELATED APPLICATIONS

This application is a continuation-in-part of application Ser. No. 08/260,566, filed Jun. 16, 1994, now abandoned.

BACKGROUND OF THE INVENTION

1. Field of the Invention

The present invention relates to a process for producing a blood dialyzer. More particularly, the present invention relates to a process for producing a blood dialyzer from artificial blood-dialyzing hollow fibers which have been produced by using a core liquid consisting of a water-insoluble liquid and from which almost all of the core liquid has been removed, by forming a bundle from the artificial hollow fibers, packing the artificial hollow fibers in a tubular case to produce a blood dialyzer module, and fixing the fibers to the tubular case with a bonding material, and removing a residual fraction of the core liquid from the artificial hollow fibers.

2. Description of the Related Art

A blood dialyzing membrane is used to execute the function of a living kidney for a patient having an incompletely functioning kidney. In the early stage of the development of the blood dialyzer, a blood dialyzing membrane was employed to remove relatively low molecular weight substances, for example, urea and creatinine from the blood. Recently, new types of high quality blood dialyzing membranes which are in the form of hollow fibers and can effectively remove medium molecular weight substances, for example, $\beta_2$-microglobulin from the blood were developed and are now becoming more important.

The processes for producing the high quality artificial hollow fiber membranes for the blood dialyzer are classified into two classes, for example, a dry spinning process and a dry-jet wet spinning process. The dry-jet wet spinning process is advantageously utilized in industry because the resultant hollow fibers exhibit an excellent blood dialyzing performance.

In the dry-jet wet spinning process for producing the hollow filaments, a core liquid is used to form a hollow space in an individual hollow filament. In this spinning process, a core liquid and a dope solution containing a fiber-forming polymer is extruded through a hollow filament-forming nozzle to form a filamentary composite stream consisting of a filamentary core stream of the core liquid and a filamentary sheath stream of the polymer dope solution surrounding the core stream. The extruded filamentary composite stream is partially dried and then introduced into a coagulating liquid bath to coagulate the filamentary sheath stream to produce a composite filament consisting of a core portion consisting of the core liquid and a sheath portion consisting of the coagulated polymer and surrounding the core portion.

As the core liquid, a water-insoluble liquid, for example a liquid paraffin or isopropyl myristate, an aqueous solution having the same composition as that of the coagulating liquid, or water has been widely used. Among the above-mentioned liquids usable for the core liquid, the water-insoluble liquid, for example, a liquid paraffin or isopropyl myristate is preferably employed in consideration of the smoothness of the inside surface of the resultant hollow fiber and the stability in the filament-forming (spinning) operation.

Almost all the water-insoluble core liquid can be removed from the resultant composite filaments by physical means, for example, centrifugalizing method or a pressurized air-extruding method. Also, a fraction of the core liquid remained in the hollow spaces of the resultant composite or hollow filaments can be removed by allowing a cleaning fluorocarbon liquid to flow through the hollow filaments.

However, the fluorocarbon liquid is disadvantageous in disrupting the ozone layer so as to cause an environmental disruption and in being very difficult to recover due to the low boiling point thereof.

SUMMARY OF THE INVENTION

An object of the present invention is to provide a process for producing a blood dialyzer having an excellent blood dialyzing performance and a high efficiency, while being very safe.

Another object of the present invention is to provide a process for producing a blood dialyzer in which a core liquid remained in a plurality of artificial hollow fibers can be completely removed by a cleaning liquid which is free from fluorocarbon liquids, without reducing the blood dialyzing performance of the artificial hollow fibers.

The above-mentioned objects can be attained by the process of the present invention for producing a blood dialyzer, which comprises the steps of:

subjecting a plurality of artificial composite fibers each comprising a core portion consisting of a water-insoluble core liquid and a sheath portion consisting of a fiber-forming polymer and surrounding the core portion, to a removal of almost all of the core liquid from the core portions, to convert the composite fibers to hollow fibers;

forming a bundle from the resultant artificial hollow fibers;

packing the artificial hollow fiber bundle into a cylindrical case having open ends thereof to produce a blood dialyzer module;

sealing the end portions of spaces left between the artificial hollow fiber peripheries and between the artificial hollow fiber bundle and the inside surface of the cylindrical case with a bonding resin material, and thereby fixing the artificial hollow fiber bundle to the cylindrical case at end portions thereof; and cleaning the artificial hollow fibers with a cleaning liquid comprising at least one member selected from the group consisting of:
  (1) aliphatic monohydric alcohols having 3 to 8 carbon atoms, and
  (2) aqueous solutions of surfactants, by allowing the cleaning liquid to enter into the hollow spaces of the artificial hollow fibers.

In the process of the present invention, preferably, the cylindrical case is provided with a pair of holes formed at the end portions of the periphery thereof, through which holes the space surrounding the artificial hollow fibers in the cylindrical case is connected to the outside of the cylindrical case, and the open ends of the cylindrical case are covered by a pair of caps each having a hole through which the hollow spaces in the artificial hollow fibers are connected to the outside of the cylindrical case.

Also, in an embodiment of the process of the present invention, the cleaning liquid comprises at least one member selected from the group consisting of
  (i) n-propyl alcohol, isopropyl alcohol and tert-butyl alcohol, and (ii) aqueous solutions of surfactants, and after the cleaning step is completed, rinsing water is flowed through the hollow spaces of the artificial hollow fibers and optionally the spaces surrounding the artificial hollow fibers in the cylindrical case, to remove a residual fraction of the cleaning liquid in the artificial hollow fibers, and then all the spaces in the module are filled with water, to provide a water filled blood dialyzer module.

In another embodiment of the process of the present invention, the cleaning liquid comprises at least one member selected from the group consisting of:

(i) n-propyl alcohol, isopropyl alcohol and tert-butyl alcohol, and (ii) aqueous solutions of surfactants, and after the cleaning step is completed, rinsing water is flowed through the hollow spaces of the artificial hollow fibers and optionally spaces surrounding the artificial hollow fibers in the cylindrical case to remove a residual fraction of the cleaning liquid in the artificial hollow fibers, a glycerol solution is flowed through the hollow spaces to impart gylcerol to the artificial hollow fibers, and then the artificial hollow fibers are dried, to provide a dry blood dialyzer module.

In still another embodiment of the process of the present invention, the cleaning liquid comprises at least one member selected from the group consisting of n-butyl alcohol, isobutyl alcohol and aliphatic monohydric alcohols having 5 to 8 carbon atoms, and after the cleaning step is completed, the artificial hollow fibers are dried, to provide a dry blood dialyzer module.

DESCRIPTION OF THE PREFERRED EMBODIMENTS

Figure 1:
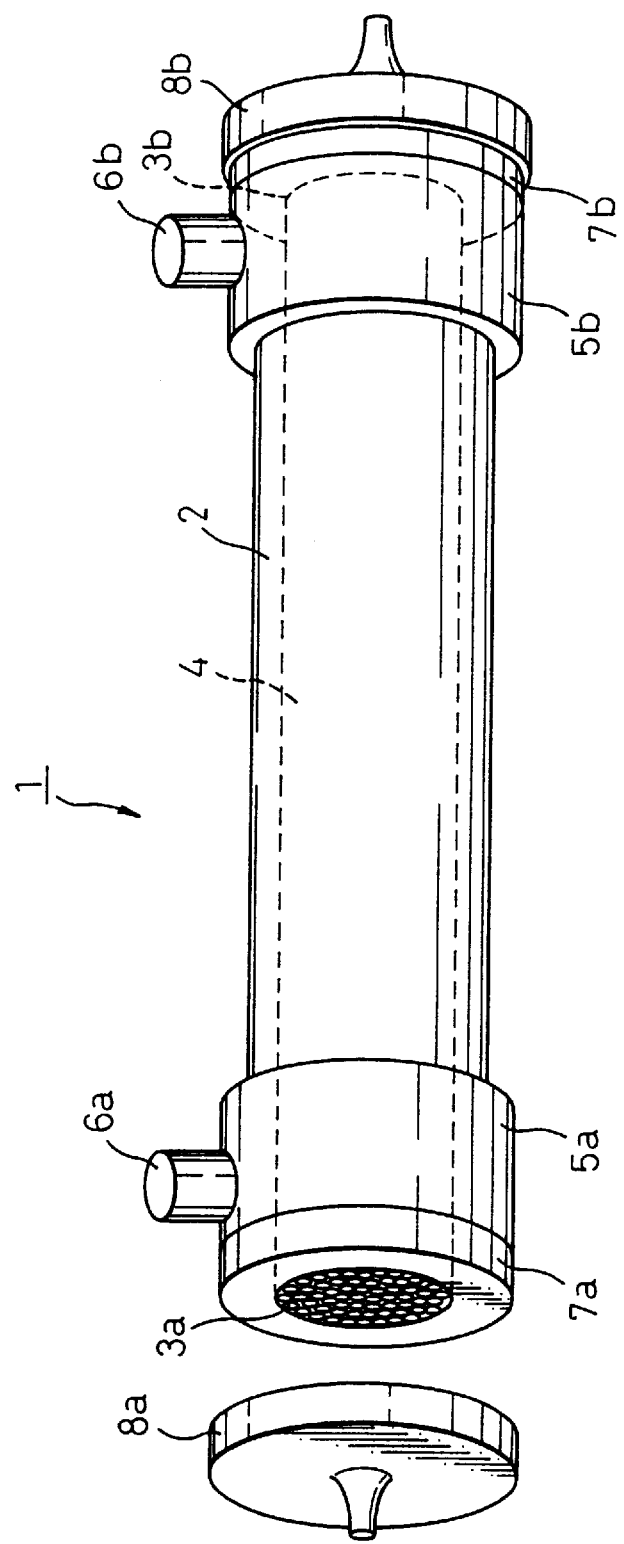
FIG. 1 is a perspective view of an embodiment of the blood dialyzer module produced in accordance with the process of the present invention.

The artificial hollow fibers usable for the present invention can be produced by the following dry-jet wet spinning procedures for a core-in-sheath type composite filament.

A core liquid consisting of a water-insoluble substance is used to form a core portion of a composite filament. Also, a dope solution containing a fiber-forming polymer dissolved in a solvent is employed to form a sheath portion of the composite filament.

The core liquid and the dope solution are subjected to an extruding step through a core-in-sheath type composite filament-forming nozzle. The extruded composite filamentary stream consisting of a filamentary core stream of the core liquid and a filamentary sheath stream of the dope solution and surrounding the filamentary core stream, travels through air gap in which a fraction of the solvent in the sheath portion is evaporated away, and then introduced into a coagulating liquid bath in which a residual fraction of the solvent is extracted by the coagulating liquid so as to cause the fiber-forming polymer in the sheath portion to be coagulated and solidified to form a solid sheath portion.

The resultant artificial composite filament consists of a core portion consisting of the core liquid and a sheath portion consisting of the coagulated polymer and surrounding the core portion.

The artificial composite filaments are cut into a desired length, and the cut fibers are subjected to the process of the present invention.

The water-insoluble core liquid usable for the present invention preferably comprises at least one member selected from the group consisting of aliphatic paraffin compounds having 10 to 30 carbon atoms, fatty acid esters having 10 to 25 carbon atoms and aromatic hydrocarbon compounds having 7 to 10 carbon atoms. The number of carbon atoms, 10 to 25, of the fatty acid esters is a total of the carbon atom number of the fatty acids and the carbon atom number of the alcohols esterified by the fatty acids.

In the process of the present invention, the water-insoluble liquid compound usable as a core liquid is preferably selected from liquid paraffin compounds having 10 to 15 carbon atoms, isopropyl myristate, toluene and xylene. Most preferably, the water-insoluble liquid compound for the core liquid is selected from the liquid paraffins having 10 to 15 carbon atoms. These paraffins are insoluble in the coagulating liquid and are incompatible with the dope solution for the sheath portion of the composite fibers and, thus, the resultant composite fibers exhibit a high resistance to undesirable deformation during the fiber-forming procedures and have a high mechanical strength. Also, when the core liquid is removed, the resultant hollow fibers have very smooth inside surfaces.

The sheath portion of the artificial hollow fibers preferably comprises a member selected from the group consisting of regenerated cellulose, cellulose esters, polysulfones, polyacrylonitrile, polycarbonates and polyamides. More preferably, the fiber-forming polymer for the artificial hollow fibers is selected from cellulose diacetate and cellulose triacetate.

The composite fibers are subjected to the process of the present invention to produce a blood dialyzer. In the first step of the process of the present invention, almost all of the water-insoluble core liquid is removed in an amount as large as possible from the core portion of the composite fibers. The composite fibers are converted to hollow fibers each having a hollow space located in the longitudinal center portion thereof and extending along the longitudinal axis thereof.

The removal step of almost all of the core liquid is carried out by a centrifugalizing method, a gravitational draining off method in which the core liquid is allowed to drain out from the core portions, or a pressurized air extruding method in which the core liquid is extruded from the core portions by a pressurized air forced into the core portions.

The resultant artificial hollow fibers contain a residual fraction of the core liquid.

A plurality of the artificial hollow fibers are formed into a bundle in which the artificial hollow fibers are regularly arranged in parallel to each other. Usually, the artificial hollow fiber bundle has a length of 210 to 330 mm and a diameter of 25 to 50 mm.

The artificial hollow fiber bundle is packed into a cylindrical case having open ends thereof for a blood dialyzer module. The cylindrical case preferably has a length of 200 to 300 mm and an inside diameter of 25 to 50 mm.

Referring to FIG. 1, a blood dialyzer module has a cylindrical case 2 having open ends 3a and 3b thereof, and a bundle 4 of a plurality of artificial hollow fibers. A pair of end cylindrical members 5a and 5b are attached to the open end portions 3a and 3b, to reinforce the open end portions 3a and 3b. The end cylindrical members 5a and 5b are provided with inlets 6a and 6b for feeding and delivering blood into and from the module 1. The end portions of spaces left between the artificial hollow fiber peripheries and between the artificial hollow fiber bundle 4 and the inside surface of the cylindrical case 2 are sealed with bonding resin layers 7a and 7b to thereby fix the artificial hollow fiber bundle 4 to the cylindrical case 2 at the open end portions 3a and 3b. The open end portions 3a and 3b are closed by a pair of caps 8a and 8b.

Figure 2:
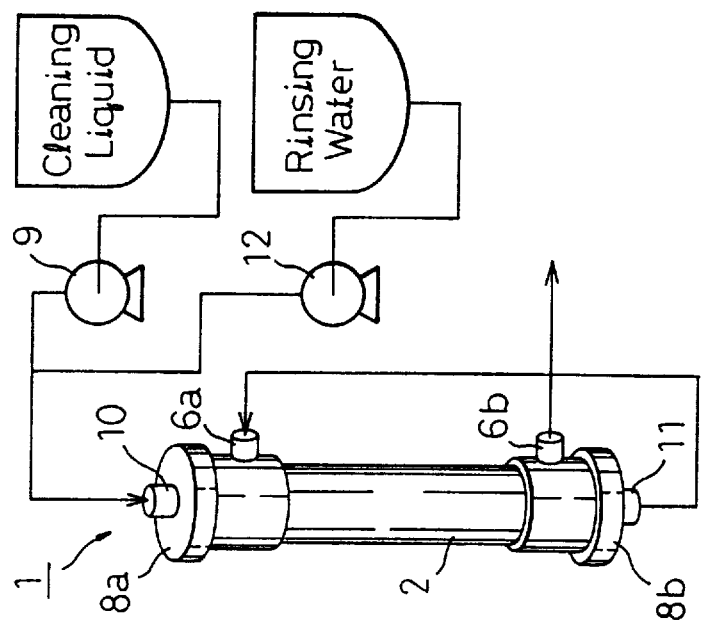
FIG. 2 is a flow sheet showing a step (A) of forming a blood dialyzer module and a step (B) of cleaning the artificial hollow fiber bundle with a cleaning liquid.
Figure 2:
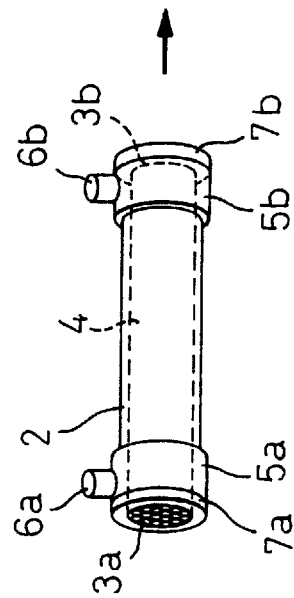

Referring to FIG. 2(A), after almost all of the water-insoluble core liquid is removed from the core portions of the artificial composite fibers and the resultant artificial hollow fibers are bundled, the resultant bundle 4 of the artificial hollow fibers is packed in a cylindrical case 2 having open end portions 3a and 3b thereof which are provided with a pair of end reinforcing members 5a and 5b having inlets 6a and outlet 6b for blood. Then, the end portion of the spaces left between the artificial hollow fibers and between the artificial hollow fiber bundle 4 and the inside surface of the cylindrical case 2 are sealed by bonding resin material layers 7a and 7b so that end portions of the artificial fiber bundle 4 is fixed to the cylindrical case 2. In the cylindrical case, the ends of the packed and fixed hollow fibers are open to the outside at the open ends of the cylindrical case 2. Spaces are left around the middle portions of the hollow fibers between the sealed end portions thereof and between the middle portion of the fixed hollow bundle 4 and the middle portion of the inside surface of the cylindrical case 2.

Referring to FIG. 2(B), the open ends 3a and 3b of the cylindrical case 2 packing therein the hollow fiber bundle 4 are closed with caps 8a and 8b to form a blood dialyzer module 1. The blood dialyzer module 1 is subjected to a cleaning step for completely removing residual core liquid from the hollow fibers.

In FIG. 2(B), a cleaning liquid is fed into the upper end portion of the module 1 through a pump 9 and an inlet 10 formed in the upper cap 8a. The liquid flows down through the hollow spaces of the individual hollow fibers and is delivered to the outside of the module 1 through an outlet 11 formed in the lower cap 8b. The delivered cleaning liquid is introduced into the upper inlet 6a located in the upper end portion of the cylindrical case 2 and flows through spaces formed between the peripheries of the individual hollow fibers and between the inside surface of the cylindrical case 2 and the hollow fiber bundle 4 to clean up the spaces. It is then delivered through an outlet 6b located in the lower portion of the cylindrical case 2. After the above-mentioned cleaning operation is complete, rinsing water is introduced into the inlet 10 of the upper cap 8 through a pump 12 and flows through the hollow spaces of the hollow fibers, the outlet 11 of the lower cap 8b, the inlet 6a of the upper end portion of the cylindrical case 2 and the spaces between the peripheries of the individual hollow fibers and between the hollow fiber bundle and the inside surface of the cylindrical case 2. It is then delivered from the module 1 through the outlet 6b located in the lower end portion of the cylindrical case 2 to remove the cleaning liquid from the module 1.

In the process of the present invention, the end portions of the spaces left between the artificial hollow fibers and between the artificial hollow fiber bundle and the inside surface of the cylindrical case are sealed by a bonding resin material, for example, a harmless polyurethane resin, and simultaneously, the artificial hollow fiber bundle is fixed at the end portions thereof to the cylindrical case. In the cylindrical case, the ends of the fixed hollow fibers are open to the outside at the open ends of the cylindrical case, and spaces are left around the middle portions of the hollow fibers between the sealed end portions thereof, and between the middle portion of the fixed hollow fiber bundle and the middle portion of the inside surface of the cylindrical case.

In the process of the present invention, the artificial hollow fibers are cleaned with a cleaning liquid by allowing the cleaning liquid to enter into the hollow spaces of the artificial hollow fibers.

In the cleaning step, the cleaning liquid optionally further cleans up the peripheries of the hollow fibers and the inside surface of the cylindrical case. For this purpose, the cleaning liquid flows through the hollow spaces of the hollow fibers and further through the spaces surrounding the hollow fibers in the cylindrical case.

In the cleaning step, the cleaning liquid preferably flows through the hollow spaces of the hollow fibers and optionally further through the spaces surrounding the hollow fibers in the cylindrical case.

The cleaning liquid usable for the process of the present invention comprises at least one member selected from the group consisting of:

(1) aliphatic monohydric alcohols having 3 to 8 carbon atoms, and (2) aqueous solutions of surfactants.

The aliphatic monohydric alcohols having 3 to 8 carbon atoms include water-soluble n-propyl alcohol, isopropyl alcohol and tert-butyl alcohol and water-insoluble n-butyl alcohol, isobutyl alcohol sec-butyl alcohol and aliphatic monohydric alcohols having 5 to 8 carbon atoms, for example, n, iso, sec, tert-pentyl alcohols, 3-methyl-2-butyl alcohol, tert-amyl alcohol, n, iso, sec and tert-hexyl alcohols, n, iso and sec-octyl alcohols and 2-ethyl hexyl alcohols. Other aliphatic monohydric alcohols having 1 to 2 carbon atoms and 9 or more carbon atoms are not appropriate as a cleaning liquid for the present invention, because they are unsatisfactory in cleaning properties regarding the core liquid.

The surfactants usable for the cleaning liquid include non-ionic surfactants and anionic surfactants. The non-ionic surfactants can be selected from surface active polyoxyethylene derivatives, oxyethylene-oxypropylene block copolymer derivatives, sorbitol fatty acid esters, polyoxyethylene-sorbitol fatty acid esters, glycerol fatty acid esters, and polyoxyethylene fatty acid esters. The anionic surfactants are selected from, for example, surface active alkyl sulfuric acid salts, alkylbenzene sulfonic acid salts and fatty acid salts.

The surfactants usable for the present invention are preferably selected from specific surfactants which exhibit a low foaming property and a good cleaning property and can be easily removed, for example, polyoxyethylene alkyl ethers, fatty acid alkanol-amides, alkylethersulfuric acid sodium salts, alkylethersulfuric acid ester sodium salts, alkylethersulfuric acid ester ammonium salts, α-olefinesulfonic acid sodium salts, alkylamine-oxides, alkylglucocides, and linear alkylbenzenesulfonic acid sodium salts, which are all soluble in water. The surfactants can be employed alone or in a combination of two or more thereof.

Preferably, the cleaning step is carried out to such an extent that the contents of the core liquid and any solvent for the spinning dope solution remaining in the cleaned hollow fibers are restricted to 2,000 ppm or less and 200 ppm or less, based on the weight of the fiber-forming polymer of the hollow fibers, respectively.

The cleaning liquid is required to have no dissolving and deteriorating property for the fiber-forming polymer of the hollow fibers, no environmental polluting property and preferably a boiling point of from 70° C. to 150° C., at which the cleaning liquid can be handled easily. Also, it is preferable that the cleaning liquid can be easily recovered and re-used.

In the process of the present invention, preferably, the cylindrical case is provided with a pair of holes formed at a pair of end portions thereof, through which holes the spaces surrounding the artificial hollow fibers in the cylindrical case are connected to the outside of the cylindrical case, and a pair of the open ends of the cylindrical case are covered by a pair of caps each having a hole through which the hollow spaces of the hollow fibers are connected to the outside of the cylindrical case.

A cleaning liquid can flow into the hollow spaces of the hollow fibers through a hole in a cap covering one nd of the cylindrical case and flow out from the hollow spaces through a hole in a cap located in the opposite end of the cylindrical case. Also, the cleaning liquid can flow into the spaces surrounding the hollow fibers through a hole formed in an end portion of the cylindrical case and flow out from the spaces through another hold formed in the opposite end portion of the cylindrical case. In the above-mentioned cleaning procedure, preferably, the cleaning temperature is 10° C. to 50° C. at a flow rate of 500–3,000 ml/min per module for 5–20 minutes.

Also, when the cylindrical case containing the artificial hollow fiber bundle is immersed in the cleaning liquid, the cleaning liquid can enter into and leave from the hollow spaces of the hollow fibers and the spaces surrounding the hollow fibers in the cylindrical case, through the holes of the cylindrical case and the holes of the caps.

In a preferable embodiment of the process of the present invention, the cleaning liquid comprises at least one member selected from the group consisting of:

(i) n-propyl alcohol, isopropyl alcohol and tert-butyl alcohol which are all soluble in water, and (ii) aqueous solutions of surfactants, and after the cleaning step is completed, rinsing water is flowed to remove a residual fraction of the cleaning liquid in the artificial hollow fibers, and then all the spaces in the module are filled with water, to provide a water-filled blood dialyzer module.

In this embodiment, the cleaning step is carried out by using a specific cleaning liquid comprising at least one of the specific water soluble aliphatic monohydric alcohols having 3 or 4 carbon atoms, and/or the aqueous surfactant solution.

Surprisingly, it was found for the first time by the present inventors that the residual fraction of the water-insoluble core liquid in the hollow spaces of the hollow fibers can be effectively removed by the specific water-soluble aliphatic monohydric alcohols having 3 or 4 carbon atoms and the aqueous surfactant solutions. The use of the specific water-soluble aliphatic monohydric alcohols having 3 or 4 carbon atoms and the aqueous surfactant solutions is contributory to preventing the deterioration of the blood dialyzing performance of the hollow fibers.

The residual fraction of the cleaning liquid in the hollow spaces can be easily removed by flowing a rinsing water, which is preferably a degassed hot water, through the hollow spaces, at a temperature of 50° to 90° C. at a flow rate of 500 to 1,500 ml/min for 20 to 100 minutes.

The water-rinsing step is advantageous not only in that the residual fraction of the cleaning liquid can be removed but also in that small amounts of a residual solvent and additives in the spinning dope solution remaining in the hollow fibers can be fully removed and thus the resultant blood dialyzer exhibits an enhanced safety.

If the peripheral surfaces of the hollow fibers and/or the inside surface of the cylindrical case are stained by a residual fraction of the core liquid, they are cleaned up and rinsed in the same manner as mentioned above. Then, the hollow spaces of the artificial hollow fibers in the cylindrical case are filled with clean water to provide a water-filled blood dialyzer module.

The clean water to be filled in the hollow spaces is sterilized water, ion-exchanged water or distilled water.

If necessary, the water-filled blood dialyzer module is sterilized, prior to using, by a γ-ray irradiation. In this sterilizing step, the deterioration of the hollow fibers by the γ-ray irradiation can be prevented by adding a γ-ray-resistant stabilizer, for example, a polyhydric alcohol, to the clean water.

When the polyhydric alcohol is added, as a γ-ray-resistant stabilizer, to the filling water, after the sterilizing step is completed, the stabilizer-containing water is removed from the hollow fibers, the inside of the blood dialyzer module is cleaned by water and then all the spaces in the module are filled with clean and sterilized water.

In the above-mentioned embodiment of the process of the present invention, the water-insoluble core liquid different from the ozone layer-disrupting fluorocarbon compounds can be fully removed from the hollow fibers, and the residual solvent and additive can be completely removed from the hollow fibers fixed to the cylindrical case of the blood dialyzer module. Therefore the resultant hollow fiber bundle and the cylindrical case are very clean and very safe.

In the process of the present invention, since the hollow fiber bundle is fixed to the cylindrical case, the cleaning step does not cause the distribution of the hollow fibers in the cylindrical case to change or to be localized. If the cleaning step is applied to a hollow fiber bundle not fixed to the cylindrical case, the distribution of the hollow fibers in the cylindrical case is easily localized or made uneven.

In the blood dialyzer produced by the process of the present invention, the dialyzing liquid can flow uniformly through the hollow spaces of the hollow fibers without generating undesirable irregular flows, and thus the blood dialyzing operation can be smoothly carried out: with great safety.

Also, since the hollow fibers in the blood dialyzer module are filled and wetted with water, no wetting operation with water is necessary before practical use.

In another embodiment of the process of the present invention, the cleaning liquid comprises at least one member selected from the group consisting of:

(i) n-propyl alcohol, isopropyl alcohol and tert-butyl alcohol which are all soluble in water, and (ii) aqueous solutions of surfactants, and after the cleaning step is completed, rinsing water is flowed through the hollow spaces of the artificial hollow fibers to remove a residual fraction of the cleaning liquid in the artificial hollow fibers, a glycerol solution is flowed through the hollow space to impart glycerol to the artificial hollow fibers, and then the artificial hollow fibers are dried, to provide a dry blood dialyzer module.

Optionally, the rinsing water is flowed through the spaces surrounding the artificial hollow fibers in the cylindrical case.

When the hollow fibers are cleaned by a specific water-soluble aliphatic monohydric alcohol having 3 to 4 carbon atoms and/or the aqueous surfactant solution and rinsed with water, hydrophilic substances, for example, a harmless humectant such as glycerol, are removed, and the resultant hollow fibers are made too dense. Therefore, a humectant, namely glycerol, must be imparted to the cleaned and rinsed hollow fibers.

The humectant (glycerol) imparted hollow fibers are dried to provide a dry blood dialyzer module.

The glycerol solution usable for the present invention is preferably a solution of 30 to 70% by weight of glycerol in a solvent consisting of at least one member selected from water and aliphatic monohydric alcohols having 2 to 4 carbon atoms, for example, ethyl alcohol, n and iso-propyl alcohols and n, iso, sec and tert-butyl alcohols.

In still another embodiment of the process of the present invention, the cleaning liquid comprises at least one member selected from the group consisting of n-butyl alcohol, isobutyl alcohol and aliphatic monohydric alcohols having 5 to 8 carbon atoms which alcohols are all insoluble in water, and after the cleaning step is completed, the artificial hollow fibers are dried by evaporating away the cleaning liquid, to provide a dry blood dialyzer module.

In this embodiment, the specific water-insoluble cleaning liquid can clean the hollow fibers without removing the humectant consisting of glycerol from the hollow fibers. Accordingly, it is unnecessary to impart glycerol to the cleaned hollow fibers.

EXAMPLES

The process of the present invention will be further explained by means of the following examples which are merely representative and do not in any way restrict the scope of the present invention.

Example 1

(1) Preparation of Cellulose Triacetate Composite Fibers

A spinning dope solution was prepared by mixing 20 parts by weight of cellulose triacetate with 24 parts by weight of triethylene glycol and 56 parts by weight of N-methyl-2-pyrrolidone (NMP), stirring the resultant mixture to provide a solution, degassing the solution and filtering the degassed solution.

The dope solution and a core liquid consisting of aliphatic liquid paraffin compounds having 10 to 20 carbon atoms are extruded through a core-in-sheath type composite filament-forming nozzle into an air gap region. The extruded composite filamentary stream is composed of a filamentary core portion consisting of the core liquid and a filamentary sheath portion surrounding the core portion and consisting of the dope solution.

After passing through the air gap, the composite filamentary stream was introduced into an aqueous coagulating bath containing NMP to coagulate and solidify the filamentary sheath portion.

The resultant composite filament was rinsed with hot water to remove a residual fraction of NMP in the composite filament, an aqueous solution of glycerol was imparted to the composite filament, and the resultant glycerol-imparted composite filament was dried and wound around a bobbin.

The wound composite filament on the bobbin was heat-treated to dimensionally stabilize the composite filament.

The composite filament had a sheath portion having an outside diameter of 230 μm, an inside diameter of 200 μm and a membrane thickness of 15 μm.

(2) Preparation of a Blood Dialyzer Module

The composite filaments were cut into a length of about 300 mm. The cut composite fibers were hung vertically to allow the core liquid to gravitationally drain off and then centrifugalized, to thereby remove about 90% by weight of the core liquid from the composite fibers.

The resultant hollow fibers are bundled to provide a hollow fiber bundle consisting of 480 individual hollow fibers having a length of about 300 mm.

The hollow fiber bundle was packed in a cylindrical case made from a clear polycarbonate resin and having a length of about 300 mm and an inside diameter of about 40 mm.

At a pair of end portions of the packed hollow fiber bundle each having a length of about 10 mm, spaces left between the hollow fiber peripheries and between the hollow fiber bundle and the inside surface of the cylindrical case were sealed with a bonding resin material consisting of a polyurethane resin, and the bonding resin material was cured at a temperature of 50° C. for 15 hours, to fix the hollow fiber bundle to the cylindrical case at the end portions thereof.

The cylindrical case was provided with a pair of holes each located at a distance of 50 mm from the corresponding open end thereof, through which holes, the spaces between the hollow fiber peripheries and between the hollow fiber bundle and the inside surface of the cylindrical case are connected to the outside of the cylindrical case.

The open ends of the cylindrical case were covered with a pair of caps each having a hole through which the hollow spaces of the hollow fibers are connected to the outside of the cylindrical case, to provide a blood dialyzer module. The caps were made from a polycarbonate resin.

A cleaning liquid consisting of isopropyl alcohol was flowed through one hole of a cap, the hollow spaces and another hole of the opposite cap, and then through one hole of the cylindrical case, the spaces surrounding the hollow fibers and another hole of the cylindrical case, at a temperature of 20° C. and at a flow rate of 2,000 ml/min, for 20 minutes, to remove residual fractions of the liquid paraffin and NMP from the hollow fibers. After the cleaning liquid in the module was partially removed by blowing pressurized air therethrough, a clean rinsing water, which was prepared by a reverse osmosis filtration, was flowed through the hollow spaces and the spaces surrounding the hollow fibers in the module in the same manner as mentioned above at a temperature of 75° C. at a flow rate of 1,500 ml/min for 30 minutes, to remove a residual fraction of the cleaning liquid in the module, and the hollow spaces of the hollow fibers and the spaces surrounding the hollow fibers were then filled with the reverse osmosis-filtered water.

In the resultant blood dialyzer module, the hollow fibers had a content of isopropyl alcohol of 50 ppm, a content of the liquid paraffin of 300 ppm and a content of N-methyl-2-pyrrolidone of 40 ppm, based on the dry weight of the hollow fibers.

(3) Tests

The blood dialyzer module was subjected to the following tests.

(a) Water-Permeability (UFR)

A time necessary to permeate 20 ml of pure water through a sheath portion of a hollow fiber at a temperature of 35° C. under a differential pressure of 300 mmHg (39,996 Pa) applied between the inside surface and the outside surface of the hollow fiber, was measured.

The UFR in ml/m²/hr/mmHg of the hollow fiber bundle was calculated from the amount of the water, the permeating surface area of the hollow fibers, the permeating time and the differential pressure.

(b) Urea Dialyzability (Urea DA)

An aqueous solution of 0.01% by weight of urea was flowed through the hollow spaces of the hollow fibers in the module, at a temperature of 37° C. at a flow rate of 200 ml/min, while allowing a portion of urea in the aqueous solution to be dialyzed through the hollow fibers, and the difference in concentration of urea between the supplied urea solution into an end of the module and the delivered urea solution from the opposite end of the module was measured.

The urea dialyzability of the hollow fiber bundle was calculated from the concentration difference.

(c) Dextran 10,000 Dialyzability (Dextran 10,000 DA)

This was determined in the same manner as the determination of the urea dialyzability except that an aqueous solution of 0.02% by weight of dextran 10,000 was dialyzed, in place of the 0.01% urea aqueous solution.

(d) Dextran 70,000 Sieving Coefficient (Dextran 70,000 SC)

An aqueous solution of 0.01% by weight of dextran 70,000 was subjected as an original solution to a permeation through the sheath portions of hollow fibers under a pressure of 10 mmHg (1,333.2 Pa).

The concentration of dextran 70,000 in the resultant permeated solution was measured. The dextran 70,000 SC was calculated from the measured data.

The test results are shown in Table 1.

Comparative Example 1

A blood dialyzer module was produced by the same procedures as in Example 1 except that the cleaning procedure was carried out by flowing 1,1,2-trifluoro-1,2,2-trichloroethane as a cleaning liquid in place of isopropyl alcohol, in the same manner as in Example 1 for 10 minutes. The resultant hollow fiber bundle in the module contained a residual liquid paraffin in a large amount of 2000 ppm and a residual N-methyl-2-pyrrolidone in a large amount of 300 ppm, based on the dry weight of the hollow fiber bundle, than those in Example 1.

The test results are shown in Table 1.

Example 2

A blood dialyzer module was produced by the same procedures as in Example 1 except that the cleaning procedure was carried out by flowing an aqueous solution of 1.0% by weight of a surfactant containing a polyoxyethylene alkyl ether and a fatty acid alkanol-amide available under the trademark of Natera from Lion Corp., in place of isopropyl alcohol, for 20 minutes in the same manner as in Example 1. After the cleaning procedure was completed, the residual aqueous surfactant solution was removed from the module by flowing a reverse osmosis filtered water for 10 minutes in the same manner as in Example 1.

It was confirmed that in the resultant hollow fiber bundle, the content of the residual liquid paraffin was reduced to 500 ppm and the content of the residual N-methyl-2-pyrrolidone was reduced to 45 ppm, based on the dry weight of the hollow fiber bundle.

The test results are shown in Table 1.

Comparative Example 2

A blood dialyzer module was produced by the same procedures as in Example 1 except that in the cleaning procedure, isopropyl alcohol was replaced by ethyl alcohol.

In the resultant blood dialyzer module, the hollow fiber bundle contained a liquid paraffin and NMP in large amounts of 5,000 ppm and 2,500 ppm, based on the dry weight of the hollow fiber bundle, respectively.

The test results are shown in Table 1.

Example 3

A blood dialyzer module was produced by the same procedures as in Example 1 except that in the cleaning procedure, isopropyl alcohol was replaced by n-propyl alcohol.

In the resultant blood dialyzer module, the hollow fiber bundle contained liquid paraffin and NMP in small amounts of 400 ppm and 80 ppm, based on the dry weight of the hollow fiber bundle, respectively.

The test results are shown in Table 1.

Example 4

A blood dialyzer module was produced by the same procedures as in Example 1 except that in the cleaning procedure, isopropyl alcohol was replaced by tert-butyl alcohol.

In the resultant blood dialyzer module, the hollow fiber bundle contained the liquid paraffin and NMP in small amounts of 600 ppm and 120 ppm, based on the dry weight of the hollow fiber bundle, respectively.

The test results are shown in Table 1.

Example 5

A blood dialyzer module was produced by the same procedures as in Example 1 except that in the cleaning procedure, isopropyl alcohol was replaced by an aqueous solution of 0.3% by weight of an anionic surfactant which was available under a trademark of Natera from Lion Corp.

In the resultant blood dialyzer module, the hollow fiber bundle contained the liquid paraffin and NMP in small amounts of 750 ppm and 80 ppm, based on the dry weight of the hollow fiber bundle, respectively.

The test results are shown in Table 1.

Comparative Example 3

A blood dialyzer module was produced by the same procedures as in Example 1 except that in the cleaning procedure, isopropyl alcohol was replaced by nonyl alcohol.

In the resultant blood dialyzer module, the hollow fiber bundle contained the liquid paraffin and NMP in large amounts of 1,500 ppm and 270 ppm, based on the dry weight of the hollow fiber bundle, respectively.

The test results are shown in Table 1.

TABLE 1

| Example No. | Item | Dialyzing performance | | | |
| --- | --- | --- | --- | --- | --- |
| | | Dextran 10,000 DA (ml/min) | Urea DA (ml/min) | Dextran 70,000 SC | UFR (ml/m$^2$/hr/mmHg) |
| Example | 1 | 46 | 194 | 0.06 | 205 |
| | 2 | 50 | 196 | 0.09 | 220 |
| | 3 | 42 | 191 | 0.05 | 190 |
| | 4 | 43 | 193 | 0.06 | 195 |
| | 5 | 52 | 196 | 0.07 | 230 |
| Comparative Example | 1 | 38 | 189 | 0.05 | 176 |
| | 2 | 32 | 187 | 0.04 | 162 |
| | 3 | 29 | 181 | 0.03 | 159 |

Table 1 clearly shows that the blood dialyzer modules produced in accordance with the present invention were excellent in dialyzing performance compared with those produced in the Comparative Examples.

Example 6

A blood dialyzer module was produced by the same procedures as in Example 1 except that after the cleaning and water-rinsing procedures were completed, a solution of 40% by weight of glycerol in isopropyl alcohol was flowed through the hollow spaces of the hollow fiber bundle at a temperature of 40° C. for 5 minutes to impart glycerol to the hollow fibers, a residual fraction of the glycerol solution was removed from the hollow spaces by blowing a pressurized air, and the resultant hollow fiber bundle in the module was heat treated at a temperature of 50° C. for 3 hours, to provide a dry blood dialyzer module.

In the resultant dry module, the hollow fiber bundle contained residual liquid paraffin and NMP in amounts of 450 ppm and 45 ppm, based on the dry weight of the hollow fiber bundle, respectively.

The hollow fibers exhibited a water permeability (UFR) of 215 ml/m²/hr/mmHg.

Comparative Example 4

A blood dialyzer module was produced by the same procedures as in Example 6 except that in the cleaning procedure, isopropyl alcohol was replaced by 1,1,2-trifluoro-1,2,2-trichloroethane, and the water rinsing procedure and the glycerol-imparting procedure were omitted.

In the resultant dry module, the hollow fiber bundle had contents of the residual liquid paraffin and NMP of 2,600 ppm and 950 ppm, respectively, based on the dry weight of the hollow fiber bundle. The hollow fibers exhibited an unsatisfactory water permeability (UFR) of 160 ml/m²/hr/mmHg.

Comparative Example 5

The same procedures as in Example 6 were carried out except that the cleaning, water-rinsing and glycerol-imparting procedures were omitted.

The resultant hollow fibers exhibited a very poor water permeability (UFR) of 120 ml/m²/hr/mmHg.

Examples 7 and 8

In each of Examples 7 and 8, a blood dialyzer module was produced by the same procedures as in Example 6 except that isopropyl alcohol was replaced by n-propyl alcohol in Example 7 and tert-butyl alcohol in Example 8.

The amounts of the residual liquid paraffin and NMP remaining in the resultant hollow fiber bundle and the water-permeability of the hollow fibers were as shown in Table 2.

TABLE 2

| Example No. | Item | Residual amount (ppm) | | UFR (ml/m²/hr/mmHg) |
| --- | --- | --- | --- | --- |
| | | Liquid paraffin | NMP | |
| Example | 7 | 770 | 26 | 185 |
| | 8 | 650 | 35 | 170 |

Examples 9 and 10

In each of Examples 9 and 10, a blood dialyzer module was produced by the same procedures as in Example 6 except that isopropyl alcohol was replaced by an aqueous solution 0.3% by weight of the same non-ionic surfactant as mentioned in Example 2 in Example 9, and an aqueous solution of 0.3% by weight of the same anionic surfactant as mentioned in Example 5 in Example 10.

The residual amounts of the liquid paraffin and NMP in the resultant hollow fiber bundle and the water permeability (UFR) of the hollow fibers are shown in Table 3.

TABLE 3

| Example No. | Item | Residual amount (ppm) | | UFR (ml/m²/hr/mmHg) |
| --- | --- | --- | --- | --- |
| | | Liquid paraffin | NMP | |
| Example | 9 | 550 | 15 | 210 |
| | 10 | 750 | 48 | 190 |

Examples 11 to 17

A blood dialyzer module was produced by the same procedures as in Example 6 except that in the cleaning step, isopropyl alcohol was replaced by a water-insoluble aliphatic monohydric alcohol as indicated in Table 4 and the water-rinsing and glycerol-imparting procedures were omitted.

The water permeability (UFR) of the hollow fibers are shown in Table 4.

TABLE 4

| Example No. | Item | Type of cleaning liquid | UFR (ml/m²//hr/mmHg) |
| --- | --- | --- | --- |
| Example | 11 | tert-butyl alcohol | 178 |
| | 12 | tert-pentyl alcohol | 186 |
| | 13 | isopentyl alcohol | 182 |
| | 14 | tert-amyl alcohol | 180 |
| | 15 | n-hexyl alcohol | 184 |
| | 16 | sec-hexyl alcohol | 178 |
| | 17 | n-octyl alcohol | 176 |

We claim:

1. A process for producing a blood dialyzer comprising the steps of:

subjecting a plurality of artificial composite fibers each comprising a core portion composed of a water-insoluble core liquid consisting of at least one aliphatic paraffin compound having 10 to 30 carbon atoms, and a sheath portion consisting of a fiber-forming polymer surrounding the core portion, to a removal of almost all of the core liquid from the core portion to convert the composite fibers to hollow fibers each having a hollow space located in the longitudinal center portion thereof and extending along the longitudinal axis thereof;

forming a bundle from the resultant artificial hollow fibers;

packing the artificial hollow fiber bundle in a cylindrical case having open ends thereof to produce a blood dialyzer module;

sealing the end portions of spaces left between the artificial hollow fiber peripheries and between the artificial hollow fiber bundle and the inside surface of the cylindrical case, with a bonding resin material, and thereby fixing the artificial hollow fiber bundle to the cylindrical case at the end portions thereof; and cleaning the artificial hollow fibers with a cleaning liquid comprising at least one aliphatic monohydric alcohol having 3 to 8 carbon atoms, by flowing the cleaning liquid through the hollow spaces of the artificial hollow fibers at a temperature of from 10° C. to 50° C.

2. The process as claimed in claim 1, wherein the artificial hollow fibers comprise a member selected from the group consisting of cellulose esters, regenerated cellulose, polysulfones, polyacrylonitrile, polycarbonates, and polyamides.

3. The process as claimed in claim 1, wherein the step of removing almost all of the core liquid is carried out by a centrifugalizing method, a gravitational draining off method or a pressurized air-extruding method.

4. The process as claimed in claim 1, wherein, in the cleaning step, the cleaning liquid further cleans the artificial hollow fiber peripheries and the inside surface of the cylindrical case.

5. The process as claimed in claim 1, wherein the cleaning liquid flows through the hollow spaces of the artificial hollow fibers and the space surrounding the artificial hollow fibers in the cylindrical case.

6. The process as claimed in claim 1, wherein the cylindrical case is provided with a pair of holes formed at the end portions thereof, through which holes the spaces surrounding the artificial hollow fibers in the cylindrical case are connected to the outside of the cylindrical case, and the open ends of the cylindrical case are covered by a pair of caps each having a hole through which the hollow spaces of the artificial hollow fibers are connected to the outside of the cylindrical case.

7. The process as claimed in claim 1, wherein the cleaning liquid comprises at least one member selected from the group consisting of n-propyl alcohol, isopropyl alcohol and tert-butyl alcohol and after the cleaning step is completed, a rinsing water is flowed through the hollow spaces of the artificial hollow fibers to remove a residual fraction of the cleaning liquid in the artificial hollow fibers, and then all the spaces in the module are filled with water, to provide a water-filled blood dialyzer module.

8. The process as claimed in claim 1, wherein the cleaning liquid comprises at least one member selected from the group consisting of n-propyl alcohol, isopropyl alcohol and tert-butyl alcohol, and after the cleaning step is completed, rinsing water is flowed through the hollow spaces of the artificial hollow fibers to remove a residual fraction of the cleaning liquid in the artificial hollow fibers, a glycerol solution is flowed through the hollow spaces to impart glycerol to the artificial hollow fibers, and then the artificial hollow fibers are dried, to provide a dry blood dialyzer module.

9. The process as claimed in claim 8, wherein the rinsing water is further flowed through the spaces surrounding the artificial hollow fibers in the cylindrical case.

10. The process as claimed in claim 8, wherein the glycerol solution is a solution of 30 to 70% by weight of glycerol in a solvent consisting of at least one member selected from water and aliphatic monohydric alcohols having 2 to 4 carbon atoms.

11. The process as claimed in claim 1, wherein the cleaning liquid comprises at least one member selected from the group consisting of n-butyl alcohol, isobutyl alcohol and aliphatic monohydric alcohols having 5 to 8 carbon atoms, and after the cleaning step is completed, the artificial hollow fibers are dried to provide a dry blood dialyzer module.

* * * * *